(12) United States Patent
Christner et al.

(10) Patent No.: US 12,405,926 B2
(45) Date of Patent: Sep. 2, 2025

(54) SYSTEM AND METHOD FOR HYDRATING GRAPH DATABASES FROM EXTERNAL DATA

(71) Applicant: Dell Products L.P., Round Rock, TX (US)

(72) Inventors: Joel Christner, El Dorado Hills, CA (US); Aurelian Dumitru, Round Rock, TX (US); Robert A. Lincourt, Franklin, MA (US); George M. Ericson, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 17/645,643

(22) Filed: Dec. 22, 2021

(65) Prior Publication Data

US 2023/0195701 A1 Jun. 22, 2023

(51) Int. Cl.
*G06F 16/21* (2019.01)
*G06F 16/901* (2019.01)

(52) U.S. Cl.
CPC ........ *G06F 16/211* (2019.01); *G06F 16/9024* (2019.01)

(58) Field of Classification Search
CPC ............................ G06F 16/211; G06F 16/9024
See application file for complete search history.

(56) References Cited

U.S. PATENT DOCUMENTS

| | | | | |
|---|---|---|---|---|
| 2015/0350324 A1* | 12/2015 | Hu | ...................... | H04L 67/1031 709/219 |
| 2015/0379409 A1* | 12/2015 | Hu | .......................... | G06N 5/02 706/55 |
| 2017/0053294 A1* | 2/2017 | Yang | .................. | G06Q 20/4016 |
| 2018/0039710 A1* | 2/2018 | Chen | .................. | G06F 16/9024 |
| 2020/0012738 A1* | 1/2020 | Tung | .................. | G06F 16/9024 |
| 2022/0147569 A1* | 5/2022 | Cooley | ............... | G06F 21/6218 |

OTHER PUBLICATIONS

Fauxman et al., Nested Mappings: Schema Mapping Reloaded, Sep. 12-15, 2006, VLDB Endowment, ACM, pp. 1-13 (Year: 2006).*

* cited by examiner

*Primary Examiner* — Jorge A Casanova
(74) *Attorney, Agent, or Firm* — Workman Nydegger

(57) ABSTRACT

One example method includes receiving, by a graph proxy, an event from an event generator, and the event includes information about an IO and information about data affected by the IO, comparing, by the graph proxy, the data to a schema, when the data is determined by the graph proxy to map to the schema, identifying, by the graph proxy, a rule that is associated with the event, and the rule specifies performance of an action when a condition is met, and when the condition is met, performing, by the graph proxy, the action, and the action is performed with respect to a graph.

19 Claims, 8 Drawing Sheets

SYSTEM AND METHOD FOR HYDRATING GRAPH DATABASES FROM EXTERNAL DATA

FIELD OF THE INVENTION

Embodiments of the present invention generally relate to hydration, that is, population of graphs and graph databases. More particularly, at least some embodiments of the invention relate to systems, hardware, software, computer-readable media, and methods for hydrating, automatically in some embodiments, graphs, and other graphical representations of data and/or information, using data such as underlying file and object data.

BACKGROUND

Graphs are a fundamental element in storing information about data assets and their relationships. Graphs are key elements in workflows such as data science, analytics, and machine learning. It is generally difficult to hydrate, that is, populate, a graph from underlying file and object data. For example, most data users undertake a largely manual, bespoke effort to have such data represented in the graph. Such difficulty, in turn, creates delays in executing such workflows.

As illustrated by the following points, conventional processes for hydrating a graph are difficult, time-consuming, and error prone. For example, users often must craft custom solutions to extract and load data into graph, including their relationships and properties. As another example, conventional approaches do not provide near real-time updates of the graph. Such delays in updating may be due to the data extract and load logic that is run in a batch type of processing. As a final example, the use of existing knowledge graphs, enterprise knowledge graphs, and public and private ontologies, are not utilized to their full capacity, and sometimes not at all. This leads to terminology confusion across graph systems. This confusion, in turn, leads to a drop in the ability to take full advantage of graphs, and not just graph databases, but overall graph algorithms such as traversals, clustering, merging, and subgraphs, for example.

BRIEF DESCRIPTION OF THE DRAWINGS

To describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be construed to limit its scope. Such typical embodiments of the invention will be described and explained with additional specificity and detail through the use of the accompanying drawings.

DETAILED DESCRIPTION OF SOME EXAMPLE EMBODIMENTS

Figure 1:
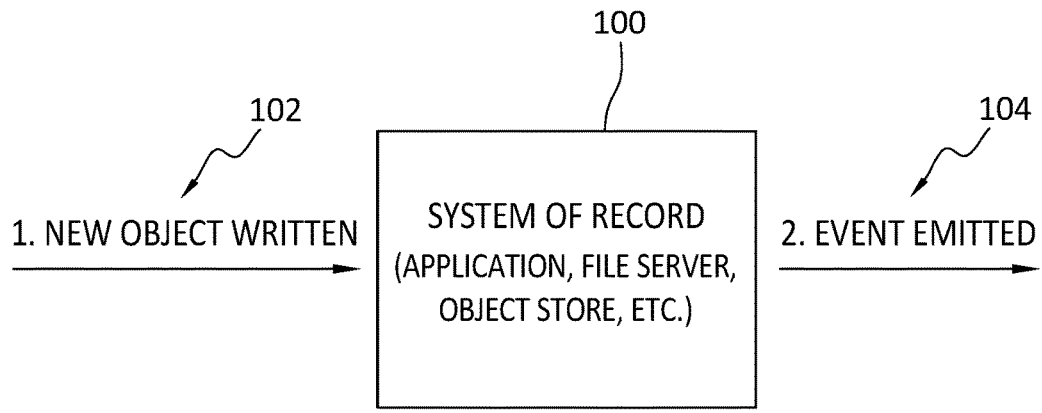
FIG. 1 discloses aspects of an example entity for generating and emitting events.

Embodiments of the present invention generally relate to hydration, that is, population of graphs and graph databases. More particularly, at least some embodiments of the invention relate to systems, hardware, software, computer-readable media, and methods for hydrating, automatically in some embodiments, graphs, and other graphical representations of data and/or information, using data such as underlying file and object data. At least some embodiments embrace a horizontal solution for hydrating a graph with information from files and objects by providing facilities to allow the user to dictate how the data should be loaded. Note that as used herein, 'hydrating' and 'hydration' and 'hydrate,' embrace, but are not limited to, processes for loading data and relationships into a graph or other visually perceptible representation of data and/or information.

In general, some example embodiments of the invention provide an architecture by which data from files and objects can be automatically loaded into a graph to help accelerate various workflows that employ the graph and/or the underlying data, files, and objects. Some embodiments enable a transmitting entity such as a computing system hardware and/or software element, application, or computing process, for example, to emit an event when data is created, modified, or deleted. A receiving entity, which may be referred to herein as a graph proxy, may listen for such events, and then act, possibly automatically, on received events. For example, the receiving entity may interact, directly or indirectly, with one or more graph databases for the purpose of creating, modifying, or deleting, a record in the graph database, and implementing corresponding changes in a graph, where such changes may include, for example, creation of graphical elements, of one or more graphs, where the graphical elements comprise, and/or represent, vertices, edges, and properties, included in and/or implicated by the graph(s). Embodiments of the invention may also enable a user, and/or a machine learning (ML) algorithm, to generate various schemas and rules for the handling of incoming events. In general, the schemas and rules may enable, in response to receipt of an emitted event or stream of emitted events, the automatic generation, automatic modification, and/or, automatic deletion, of graph elements including, but not limited to, vertices, edges, and properties. In this way, the graph may be updated in near-real time as events are emitted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways to define yet further embodiments. Such further embodiments are considered as being within the scope of this disclosure. As well, none of the embodiments embraced within the scope of this disclosure should be construed as resolving, or being limited to the resolution of, any problem(s). Nor should any such embodiments be construed to implement, or be limited to implementation of, any technical effect(s) or solution(s). Finally, it is not required that any embodiment implement any of the advantageous and unexpected effects disclosed herein.

One advantageous aspect of at least some embodiments of the invention is that graphs may be generated, and modified, automatically in response to detection of one or more emitted events. Embodiments may provide for ongoing automatic updates to a graph. Embodiments may provide for use of an ML model to generate and/or modify rules and/or schemas for handling emitted events. Various other advantageous aspects of some example embodiments are disclosed elsewhere herein. Embodiments may improve the speed and accuracy of processes that rely for their successful performance on a graph and/or the information contained in the graph.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

Graphs may be a fundamental element for storing information about entities such as, but not limited to, data assets and their relationships. Graphs may be key elements to workflows such as data science, analytics, and machine learning. Graphs may contain three primary classes of data. The first of these is vertices. In some embodiments, a vertex in a graph may represent a data asset, although the scope of the invention is not so limited. The second class of data that may be included in a graph is an edge. In general, an edge includes dimensions of a relationship between two vertices of graph. An edge may have at least two dimensions. The first dimension is a direction that indicates whether a relationship between vertices is one way, or bidirectional. The second dimension is a type, such as 'Drives' for example, that comprises a classification of the edge, that is, of the relationship between two vertices. The third class of data that may be included in a graph is properties. A property provides additional metadata about a vertex or additional metadata about an edge. Properties are useful to the application using the graph data. The following example illustrates some of these concepts.

In this example, there are various elements that are related in various ways by one or more vertices, edges, and properties. For example, 'Joel' (a human) and 'Toyota' (motor vehicle) are vertices, and 'Drives' is an edge that connects 'Joel' to 'Toyota.' This edge may indicate that 'Joel' 'Drives' a 'Toyota.' This example edge is one-directional from 'Joel' to 'Toyota' since the 'Toyota' cannot 'Drive' 'Joel.' In this example, 'Joel' may have additional properties such as 'Hair: Brown,' and 'Toyota' might have a property such as 'Model: Highlander.' Finally, the 'Drives' edge might have some properties such as 'Frequency: Low.'

B. Aspects of Some Example Embodiments

Attention is directed now to various example embodiments of the invention. As noted earlier, typical data users undertake a largely manual, bespoke effort to have such data represented in the graph. Thus, example embodiments of the invention may eliminate the need for manual processes, as well as the problems that attend such processes, through implementation of a horizontal solution for hydrating a graph with information from files and objects by providing facilities to allow the user to dictate how the data should be loaded into the graph. As such, embodiments may improve the speed and efficiency with which graph-centered-workflows are performed. For example, to enable execution of graph-centered workflows, data must be present in the graph. Further, data stored in the graph must have some meaningful properties and relationships to be useful. Much of enterprise data is semi-structured, such as in the form of JSON (JavaScript Object Notation), XML (Extensible Markup Language), or CSV (Comma-Separated Value format), for example, and stored in file servers and object repositories, examples of which include the cloud-based Dell ECS (Elastic Cloud Storage) and Amazon S3. Example embodiments may capture, and render in graphical form, such properties and relationships between/among data.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any form of representing and storing data or other information. Rather, such principles are equally applicable to any object capable of representing information.

With particular attention now to FIG. 1, a configuration and process flow are disclosed in which a system of record 100 receives an IO (Input/Output operation) 102, such as a write request for a new object. As shown, the system of record 100 is broad in scope and may embrace, but is not limited to, an application, file server, object store, and/or other entity. In response to receipt of the IO 102, the system of record 100 may automatically generate, and emit, an event 104 that corresponds to the IO 102. The events 104 may be generated and emitted in real time as IOs 102 are received or may be generated and retained in a buffer for a period of time before being emitted. In the latter case, the events 104 may be stored in different buffers according to the characteristics of the respective data that were the catalyst for generation of the various events 104. The events 104 may be emitted by the system of record 100 over any of a variety of mediums including, but not limited to, webhook invocations, message queues, remote procedure calls, RESTful APIs, or otherwise. The event 104 may include, and/or refer to, one or more objects or other data that were affected by the IO 102.

Further, the IO 102 may comprise any operation(s) that operates on data. Examples of IOs thus include, but are not limited to, reads, writes, deletes, replications, data transfers, object writes, file writes, and changes to a state of the data. In addition to creating the event 104, the system of record 100 may also generate metadata about the event 104, and metadata about the data change, that is, the IO 102, that triggered generation of the event 104. The metadata about the event, and/or the metadata about the data, may comprise, for example, one or more properties of the data, and/or properties of the entity that generated the IO 102.

Figure 2:
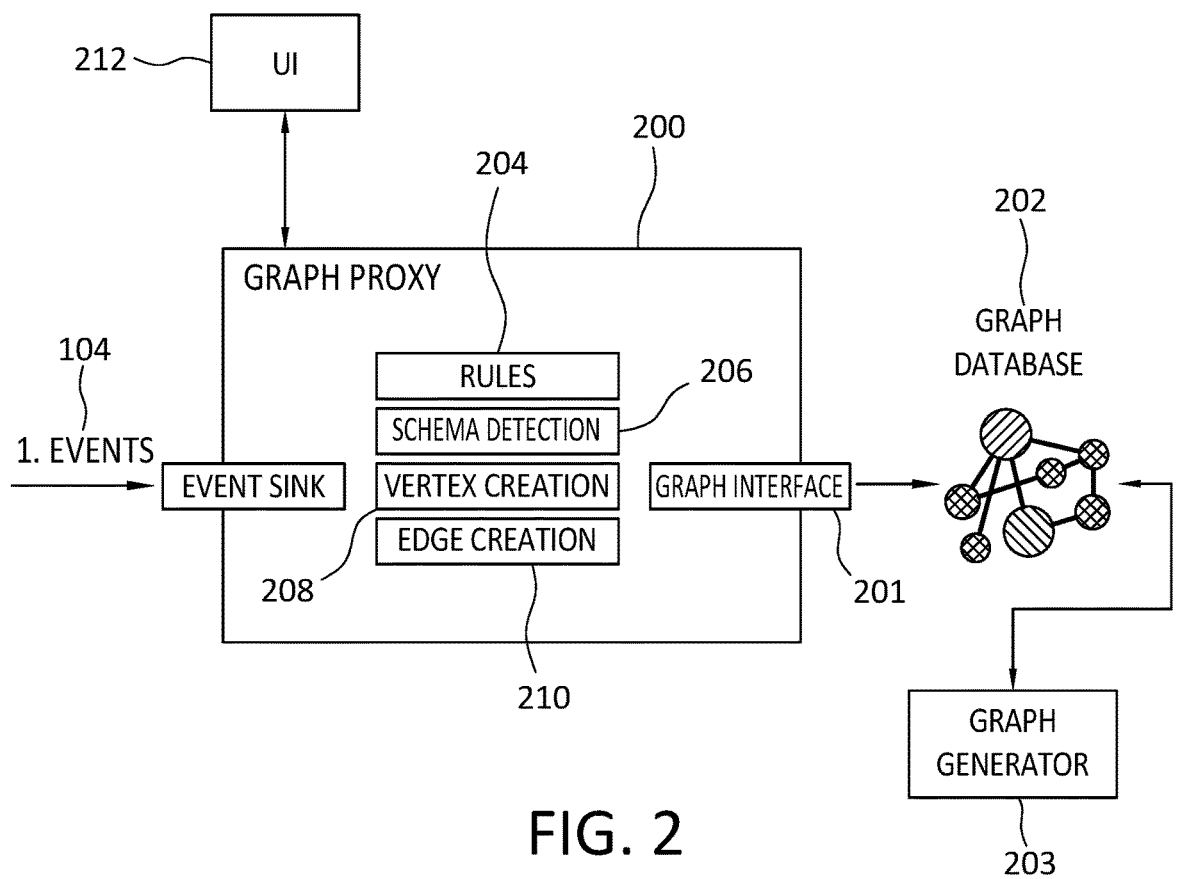
FIG. 2 discloses aspects of an example graph proxy.

Turning next to FIG. 2, a system and/or process, which may or may not be implemented as an element of the system of record 100, may be provided that comprises a graph proxy 200. In general, the graph proxy 200 may listen for events 104 and take action concerning the incoming events 104. The event 104 may include, and/or may reference, the object(s) or other elements that were the subject of the IO(s) 102.

As well, the graph proxy 200 may also interact, such as by way of a graph interface 201, with a graph database 202 for the purpose of creation, modification, and deletion, of one or more database records. That is, the graph database 202 may include various records that may be modified or deleted and, further, records may be added to the graph database 202. Such modification, creation, or deletion may be performed by, and/or, at the direction of, the graph proxy 200. Example records that may be stored in the graph database 202 include, but are not limited to, vertices, edges, and properties.

The graph database 202 may be automatically queried by a graph generator 203 that accesses graph database 202 records to generate graphs based on those records. The graph generator 203 may, or may not, be combined with the graph database 202 in a single computing entity that is able to create, modify, or delete records, and also to generate graphs based on the records. In some embodiments, the graph generator 203 may query the graph database 202 on a recursive basis to help ensure that one or more graphs generated based on those records are kept up to date. Graphs generated by the graph generator 203 may be viewed by a user with the UI 212 and/or the graphs may be transmitted by the graph generator 203 to one or more entities.

As disclosed in FIG. 2, the graph proxy 200 may comprise various modules. Such modules may include, but are not limited to, a rules module 204, schema detection module 206, vertex creation module 208, and an edge creation module 210. These modules may, but need not, all reside in the graph proxy 200. In other embodiments, any one or more of the modules may operate as a standalone entity that may be configured to communicate with the other modules, and with the graph proxy 200.

In some embodiments, a user may predefine, such as by way of a UI 212 (User Interface) that may be, for example, a GUI (Graphical User Interface) or a CLI (Command Line Interface), a set of schema rules, using the rules module 204, in the graph proxy 200 that may be used by the schema detection module 206 to identify the schema of incoming objects, or other data, and objects, or other data, identified by an incoming event 104. In some embodiments, the schema rules may be defined, and/or modified, by a trained ML algorithm without human input. A schema of data, for example that has been added or modified, for example, may be identified by the schema detection module 206 in various ways. Note that, in general, any user interaction with the graph proxy 200 may take place by way of the UI 212.

For example, the schema detection module 206 may identify a schema of an object by implication, that is, a received event 104 that has specific metadata criteria matches would be associated with a given schema. For instance, all objects received by the graph proxy 200 that were written, according to an IO such as the IO 102, to bucket 'person' should conform to the schema that a user or other entity has defined for 'person.' In addition, or as an alternative, to identification by implication, the scheme detection module 206 may identify a schema for an object by association, that is, objects received by, or at least identified to, the graph proxy 200, may have their respective schema derived, by the schema detection module 206, from the object content. The derived schema may then be compared, by the schema detection module 206, against a set of schemas, previously uploaded by the user or other entity, to identify a match between the detected schema and the prior schemas.

Schema definitions may be proprietary, or may leverage a standard mechanism, such as JSON (JavaScript Object Notation)/JSON schema, XML (Extensible Markup Language)/XSD (XML Schema Definition), unified modeling language, resource description framework, or other. Example proprietary schemas are discussed below. Finally, it should be noted that example embodiments may use implication and/or derivation to determine the schema of an object.

With continued attention to FIG. 2, a user or other entity, such as a trained ML algorithm for example may, such as by way of the UI 212, define, or cause the definition of, one or more vertices and/or one or more edges. The vertices and edges may be defined, respectively, using the vertex creation module 208 and the edge creation module 210. In one example embodiment, a user may predefine, using the vertex creation module 208, a set of vertex rules in the graph proxy 200 to specify how and when a vertex should be created in a graph to represent the data contained within the object or event identified, and/or received, by way of the event 104 and/or one or more other events 104.

As well in example embodiments a user or other entity, such as a trained ML algorithm, may be able to specify which properties from the source, that is the source of the object(s) and other data/metadata included in, or referenced by, one or more emitted events 104, should be carried over as properties in the created vertex. Further, the user may be able to specify one or more conditions upon which the vertex should, or should not, be created.

A user or other entity, such as a trained ML algorithm, may use the edge creation module 210 to define a set of edge creation rules in the graph proxy 200 to specify how and when one or more edges should, or should not, be created based on properties and/or other metadata within the source data, that is, properties and metadata in the data received in, or identified by, one or more events 104 received at the graph proxy 200. Since edges are relationships created between vertices, it may be the case in some circumstances that certain vertices may need to be created in a graph a priori, that is, without reliance on, or reference to, any prior observations or experience. For instance, creation of a vertex for source data 'Joel' may dictate that a relationship, that is, an edge, also be connected to a pre-created vertex called 'Person,' and in this example, 'Person' would be created a priori in the graph, and be referenced within the rule.

C. Further Discussion

As will be apparent from this disclosure, example embodiments may implement a variety of features and functionalities. For example, a file, object, or other data, may be automatically represented in a graph database, along with any relationships of that file, object, or other data, to other files, objects, and data. As another example, the conditions under which a file, object, or other data, is automatically represented in a graph database can be programmatically defined and implemented by a user and/or by an ML algorithm. Further, the conditions by which relationships amongst vertices represented in a graph database may be programmatically defined by a user, and such relationships may be automatically built by an entity such as an ML algorithm on behalf of the user. Another example feature of some embodiments is the dramatic decrease, relative to conventional approaches, in the time between the creation of new data on a system of record and when the data becomes useful for cases such as analytics, data science, and machine learning. By enabling this event-based system, example embodiments may allow for a more near real-time system which enables multiple use cases that are not possible today. As a final example, embodiments may employ layering and utilization of multiple ontologies and knowledge graphs to create a fully linkable set of graphs. This approach may enable interoperating subgraphs and graph systems that create optimal sharing of data and knowledge generation.

D. Aspects of Some Illustrative Examples

Figure 3:
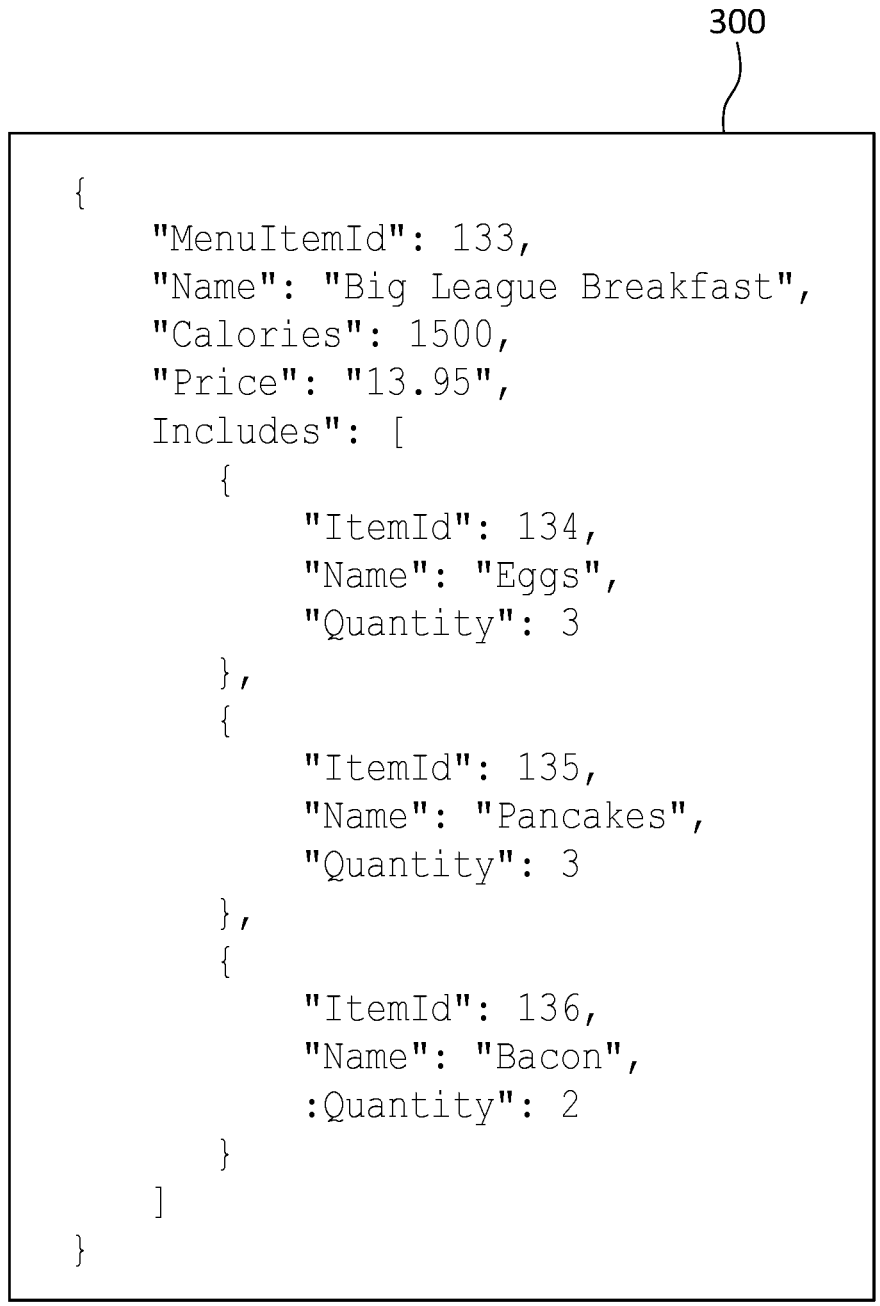
FIG. 3 discloses aspects of an example object which may be processed by some embodiments.

With reference now to FIGS. 3-7, details are provided concerning some illustrative examples of embodiments of the invention. In FIG. 3, an object 300, in the form of a breakfast menu item, is shown. In this illustrative example, object data for breakfast menu items may be automatically loaded into a graph, and relationships may be created under the following circumstances: 1) the meal contains eggs, and 2) the meal is considered high calorie or low calorie.

As shown, the breakfast menu item object 300 may have various attributes or properties such as, for example, a 'menu item ID' (133), a 'name' (Big League Breakfast), a 'number of calories' (1500), a 'price' ($13.95), and an 'includes' property that lists various item IDs and items included in the Big League Breakfast. That is, the 'includes' property indicates that the Big League Breakfast includes 'eggs' ('ItemID' 134) with 'Quantity' 3, 'Pancakes' (ItemID 135) with 'Quantity' 3, and 'Bacon' (ItemID 136) with 'Quantity' 2.

A pre-defined set of schema rules may be created by a user, to which incoming objects, such as the breakfast menu item object 3 would conform as described above, that is, through implication and/or association. As noted in FIG. 4, the schema 302 that has been defined for the Big League Breakfast is assigned a 'SchemaID' of 5, and also references another schema 304, with 'SchemaID' 6, that specifies the items included in the Big League Breakfast. That is, the schema 304 that has been designated 'SchemaID' 6 lists the items that must be included in the 'includes' property of an object for that object to be determined as conforming with schema 304. Note that an object may conform with schema 304, but not conform with schema 302, and vice versa.

Thus, an object that includes all the properties, and only the properties, indicated in the schemas 302 and 304 may be considered as having mapped to schema 302. On the other hand, if an object includes all, and only, the fields in 'Schema5' but the 'includes' field of that object lists only 2 items instead of 3, as required by 'SchemaID' 5, then the object considered to map neither to 'Schema ID' 5 nor to 'SchemaID' 6. That is, all the properties included in, and referenced by, a schema, must be included in an object for that object to be deemed as mapping to that schema. In examples such as this, the schema 302 with 'SchemaID' 5 may be referred to as a 'parent' schema, and the schema 304 with 'SchemaID' 6 may be referred to as a 'child' schema. A child schema may be incorporated into a parent schema by the reference of the parent schema to that child schema.

Figure 4:
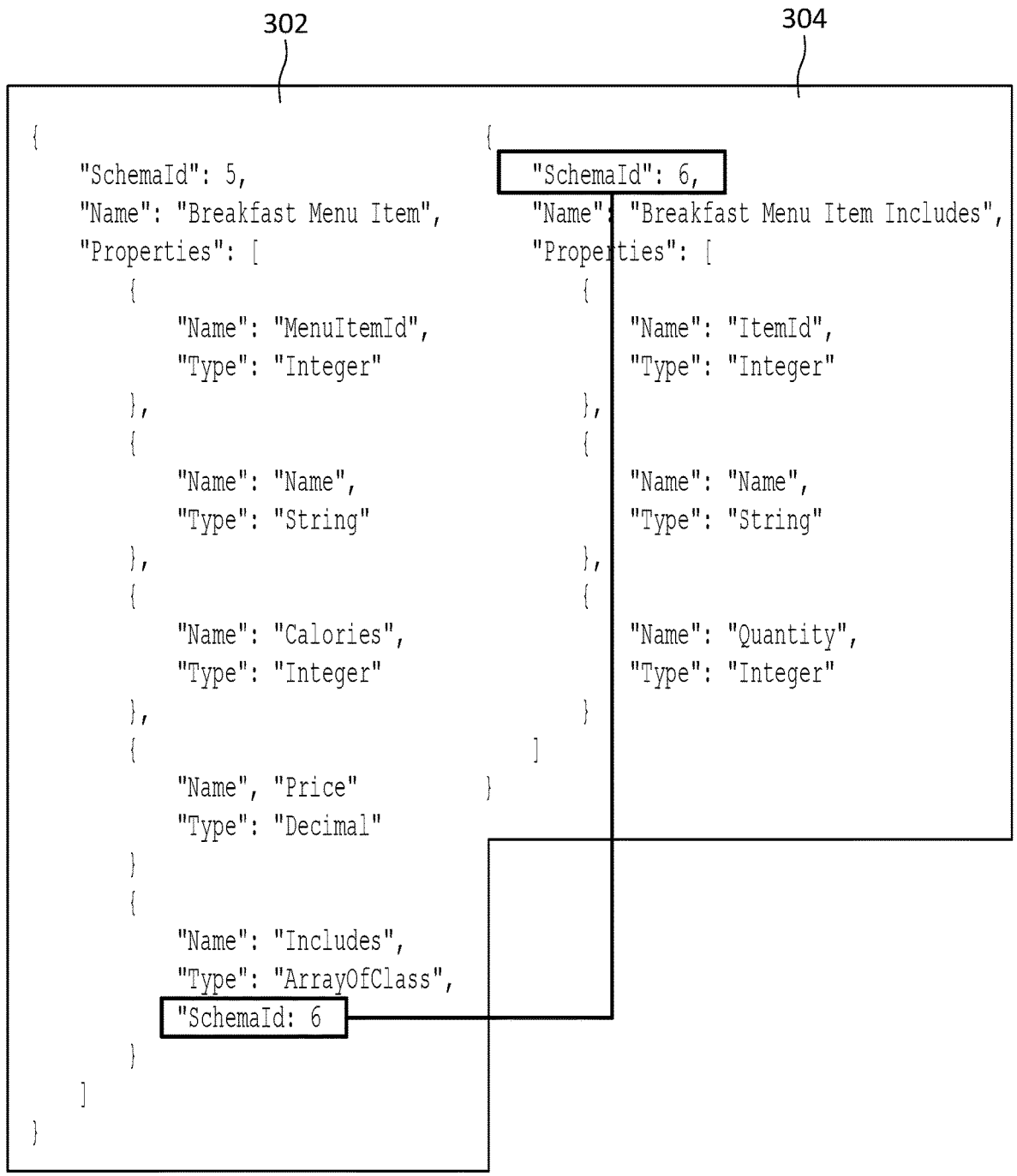
FIG. 4 discloses aspects of an example parent schema that references an example child schema.

As indicated in FIG. 4, the combination of properties of the object 300, which may be received as part of an IO, may be compared to the applicable schema(s) to determine if that object 300 maps to such schema(s) or not. If the object 300 does not map to a particular schema, a new schema may be created, possibly automatically, to which the object maps. Alternatively, the unmapped object may not be further processed and, as such, may not be reflected in graph that identifies objects that do map to that schema. For example, if an object concerns a car tire, then the object will not map to a schema that defines a breakfast menu item, and thus that object may not be processed further.

Figure 5:
FIG. 5 discloses an example vertex rule.
Figure 6:
FIG. 6 discloses example edge rules.

Turning next to FIG. 5, details are provided concerning creation of vertices after a determination has been made that an object maps to one or more schemas. Various rules, such as the example rule 400, may be defined for the creation of vertices. The rules for creating vertices may be preconfigured by a user, but that is not necessarily required. In this example, if an object maps to the schema 302 "SchemaId" 5, and by implication, maps to schema 304 as well, a vertex may be created. It is noted that after a successful mapping of an object to one or more schemas, A) several conditions may exist, and B) the action taken may have more actions beyond simply creating the vertex, such as specifying which properties to carry over into the vertex and potentially external information that could be gathered to include in the properties of the vertex.

With reference to the example rule 400, if an object maps to the schema 302, that is, the schema whose 'SchemaID' is 5, then a vertex may be created. On the other hand, if an object does not map to the schema 302, then the rule 400 provides that a vertex will not be created.

With the schema and vertex rules in place, edge rules may then be created. For this example, we want two edges to be conditionally created. With reference to the examples of FIG. 6, and if the object 300 maps to schema 302, particularly the edge creation rule 500, (if the breakfast menu item contains eggs), a relationship, denoted as an edge in a graph, should, according to the 'TargetID' parameter of rule 500, be created between the newly created vertex and the pre-existing 'Eggs' vertex.

Similarly, and referring next to the edge creation rule 600, if the breakfast menu item has over 1,000 calories, an edge should, according to the 'TargetID' parameter (value 52) of the rule 600, be created between the newly created vertex and the pre-existing 'High Calorie' vertex. On the other hand, if the breakfast menu item has 1000 calories or less, an edge should, according to the 'TargetID' parameter (value 54) be created between the newly created vertex and the pre-existing 'Low Calorie' vertex.

Figure 7:
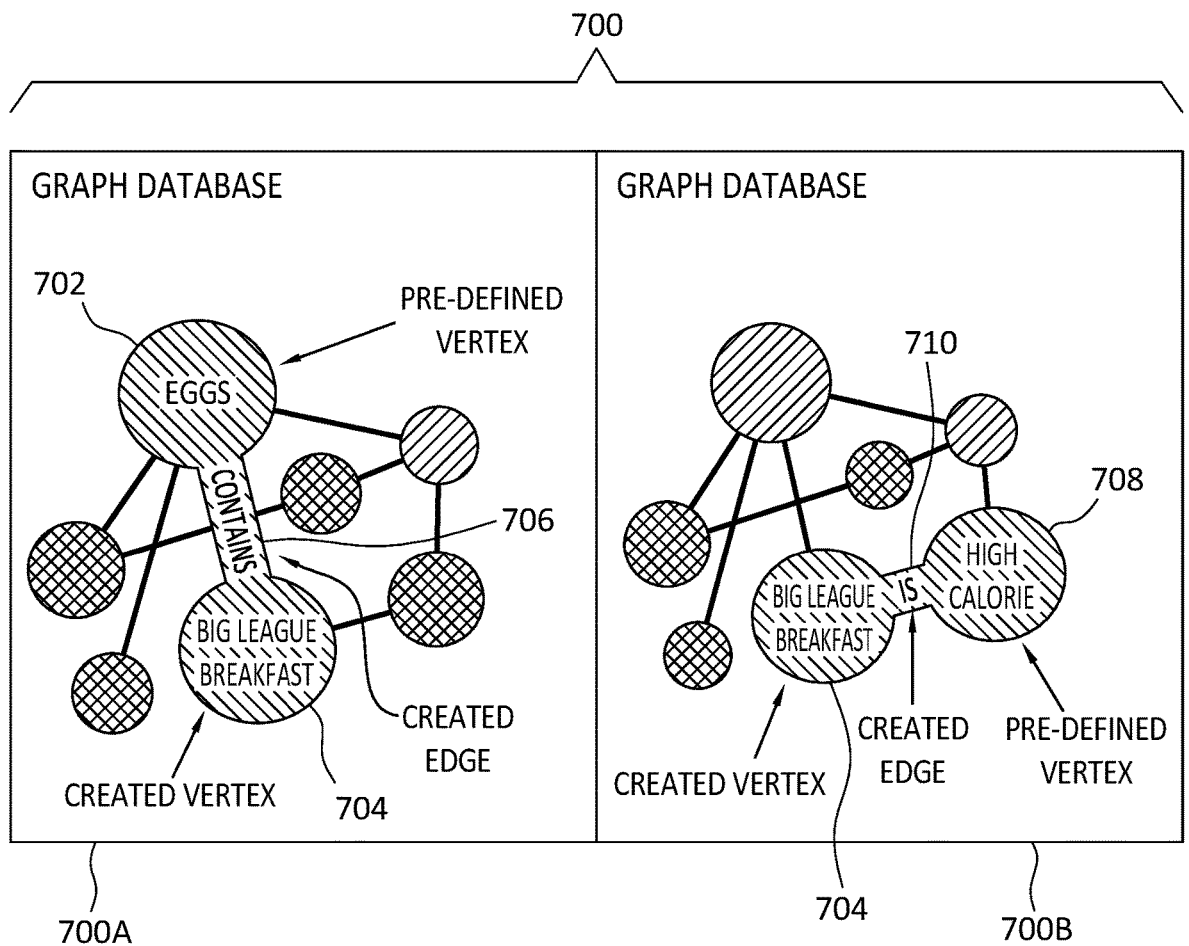
FIG. 7 discloses example graphs that may be generated by some embodiments.

To briefly summarize, and with reference now to the example graphs/graph databases 700 of FIG. 7, when the event is received for an object that corresponds to the newly-created 'Big League Breakfast' menu item, a schema of that object may be discerned, through implication and/or association, a vertex may be created in the graph for the menu item, and one or more edges may be created to 'Eggs' and 'High Calorie' as shown in the example graphs/graph databases 700A and 700B of FIG. 7.

More particularly, and as noted earlier, 'Eggs' may be a pre-defined vertex that was included in a graph and/or graph database prior to receipt of a menu item object, such as the menu item object 300. Subsequently, and as discussed above, a menu item object named 'Big League Breakfast' may be implemented that maps to a particular schema of interest and, by virtue of such mapping, is the basis for addition of the vertex 704 to the graphs/graph databases 700. Because analysis of the 'Big League Breakfast' object indicated that one of the items included in that object is 'Eggs,' an edge 706 is created in the graphs/graph databases 700 that indicates a relationship between the 'Big League Breakfast' vertex 702 and the 'Eggs' vertex 704. In the example of FIG. 7, the edge 706 is denoted 'Contains' since the Big League Breakfast includes eggs. The edge 706 is one-way however, since while the Big League Breakfast includes eggs, it does not follow that eggs include a Big League Breakfast.

Note that because the Big League Breakfast is defined as including certain items, such as eggs, each of those items may have a pre-defined vertex included in the graph so that, upon creation of the Big League Breakfast object, that object is able to refer, in the graph, to items included in that menu item. Other pre-defined vertices could be defined and implemented that may, or may not, constitute elements of a Big League Breakfast. For example, bacon may be the subject of a pre-defined vertex, and the same may be true for sausage, but since sausage is not in the Big League Breakfast, the vertex 704 would not be connected to sausage. However, a different breakfast might refer to the pre-defined sausage vertex. Thus, a grouping of pre-defined vertices may be employed which may be respectively associated with one or more breakfast menu items.

With continued reference to the example of FIG. 7, a graph/graph database 700B may include a 'high calorie' vertex 708 which, like the 'eggs' vertex 702, may be a pre-defined and implemented vertex. Because it is known from the object 300 that the calorie count for the Big League Breakfast is 1500, the vertex 704 may be connected to the vertex 708 by an edge 710 according to the edge rule 600 which specifies that any calorie count greater than or equal to 1000 is considered 'high calorie.'

If there are external food ontologies, this data may additionally be sent to another graphing system aware of those ontologies to generate vertices, and relationships based on those ontologies. This may allow the graph to be built or generated with terminology and relationships that are impactful to the end users in accordance with predefined schemas, consistent naming, and consistent structures. Patterns such as this may increase the ability to generate knowledge and increase intelligence. Having this knowledge to model against for AI is simplifying models and feature vectors.

As the example of FIG. 7 illustrates, objects associated with incoming events, which may be events in a continuous incoming event stream, may be quickly processed and included in one or more graphs through the use of schemas, and the application of vertex rules and edge rules. Graphs may be both created, and modified, using such schemas and rules. The example of FIG. 7 also illustrates that relationships between data, such as objects for example, may be quickly rendered in a graphical form that is visually perceptible by a human and/or by devices such as video cameras and scanners. At least because they may be quickly generated and updated, graphs according to example embodiments may be used to improve the speed and efficiency of computing processes that rely on the graphical representation of objects, relationships, object properties, and relationship properties.

E. Example Methods

Figure 8:
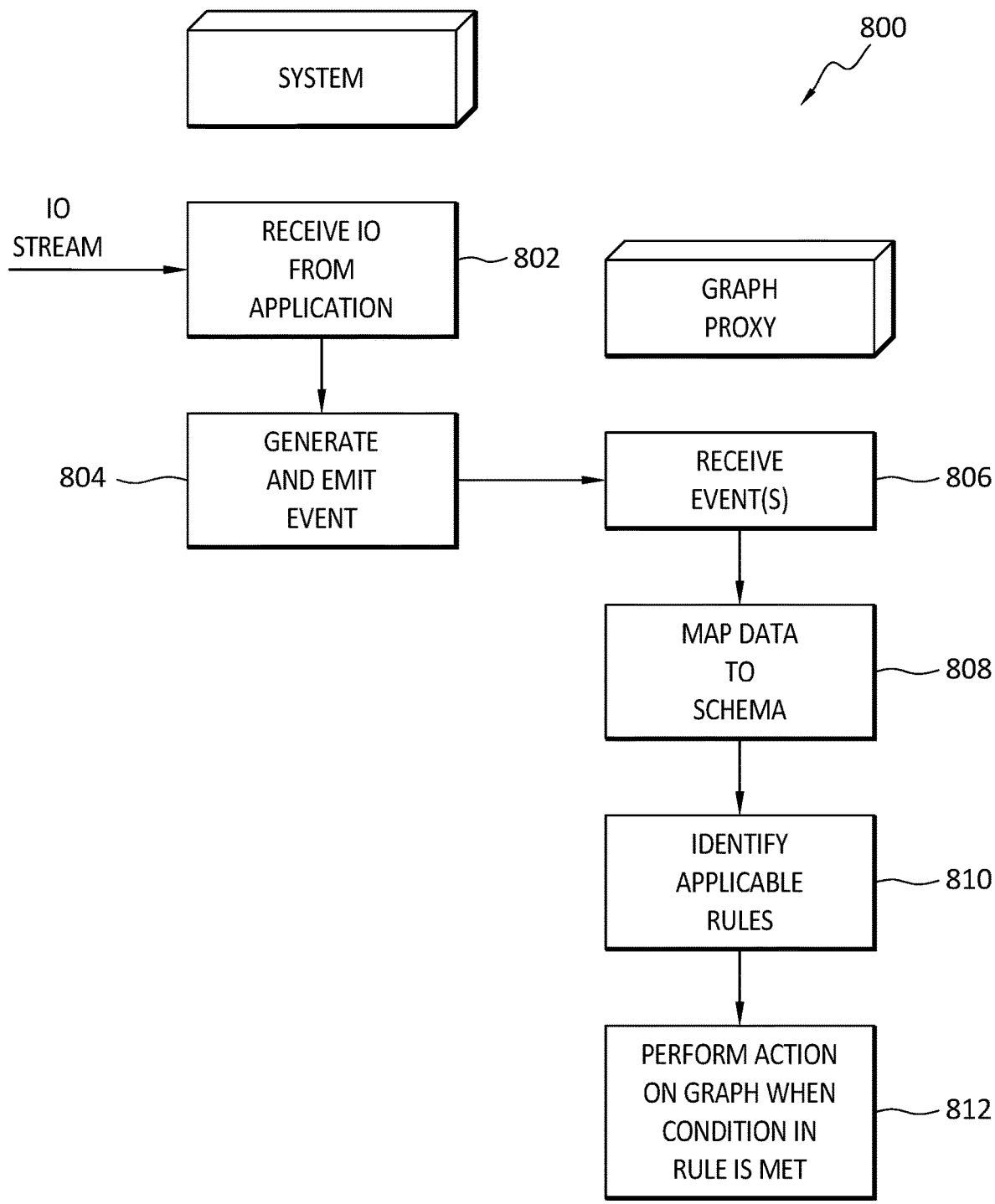
FIG. 8 discloses an example method for using emitted events to modify a graph.

It is noted with respect to the example method of FIG. 8, that any of the disclosed processes, operations, methods, and/or any portion of any of these, may be performed in response to, as a result of, and/or based upon, the performance of any preceding process(es), methods, and/or, operations. Correspondingly, performance of H one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 8, an example method 800 is disclosed. Initially, a system, such as a system of record or other entity, may listen for, and receive 802, an IO stream from an application, or group of applications, or any other data generator, that is, any other system or device operable to generate new and/or modified data. The IO may, for example, add an object, delete an object, move an object, or modify an object.

The system may parse or otherwise evaluate the IOs to determine the nature of the operation to be performed, and the data that will be affected by performance of that operation. Based on this parsing or other analysis, the system may generate and transmit an event 804. The event may include information about the operation specified in the IO and/or the data affected by that operation.

The transmitted event may be received 806 by a graph proxy. The graph proxy may be hosted at a server accessible by a group of clients, although that arrangement is not necessarily required. In some embodiments, the graph proxy may be hosted at a cloud storage or cloud computing site to listen for IOs incoming from one or more clients to the cloud storage site or cloud computing site. More generally, no particular configuration or hosting of the graph proxy is required.

After an event has been received 806 by the graph proxy, the graph proxy may apply one or more schema rules to determine whether an object associated with the event that was received 806 matches one or more schemas. If no match is found between the object and a schema, the method 800 may terminate. On the other hand, if the object is determined to match to a schema, the object may be mapped 808 to the schema.

After the object has been mapped 808 to a schema, one or more rules applicable to the object may be identified 810. A rule may specify, for example, an action that is to be performed with respect to a graph, or graph element, when one or more conditions, which may also be specified in the rule, are met.

Finally, when a determination has been made that a condition specified in a rule has been met, the action specified by that rule may be performed 812. Note that multiple rules, conditions, and actions, may be involved in creating or modifying a graph or creating, modifying, or deleting, a graph element. For example, at 810, multiple rules may be identified, and each of those rules may specify one or more conditions and actions.

The method 800 may be performed on an ongoing basis. Alternatively, the method 800 may be performed until an identified stream of IOs has been processed. Further, the system may listen for IOs on an ongoing basis, or during a user-specified times, or for IOs from a particular application, or from a particular client

E. Further Example Embodiments

Following are some further example embodiments of the invention. These are presented only by way of example and are not intended to limit the scope of the invention in any way.

Embodiment 1. A method, comprising: receiving, by a graph proxy, an event from an event generator, wherein the event includes information about an IO and information about data affected by the IO; comparing, by the graph proxy, the data to a schema; when the data is determined by the graph proxy to map to the schema, identifying, by the graph proxy, a rule that is associated with the event, and the rule specifies performance of an action when a condition is met; and when the condition is met, performing, by the graph proxy, the action, and the action is performed with respect to a graph.

Embodiment 2. The method as recited in embodiment 1, wherein the action comprises one of creating, updating, or deleting, an element of the graph.

Embodiment 3. The method as recited in any of embodiments 1-2, wherein the action is performed with respect to an element of the graph, and the element of the graph comprises one of a vertex, an edge, a property of a vertex, or a property of an edge.

Embodiment 4. The method as recited in any of embodiments 1-3, wherein the schema is a parent schema that references a child schema, and the data matches the parent schema and the child schema.

Embodiment 5. The method as recited in embodiment 3, wherein the element is a property, and the action performed by the graph proxy comprises modifying the property.

Embodiment 6. The method as recited in any of embodiments 1-5, wherein the action comprises creating an edge of the graph, and the method further comprises specifying a property for inclusion in the edge.

Embodiment 7. The method as recited in any of embodiments 1-6, wherein the action is performed automatically when the condition is met.

Embodiment 8. The method as recited in any of embodiments 1-7, wherein the schema is identified by implication.

Embodiment 9. The method as recited in any of embodiments 1-8, wherein the schema is identified by an association process in which a schema is derived from the data, and the schema to which the data is compared is the derived schema.

Embodiment 10. The method as recited in any of embodiments 1-9, further comprising creating, a priori based on another rule, an edge in the graph.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer+ hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
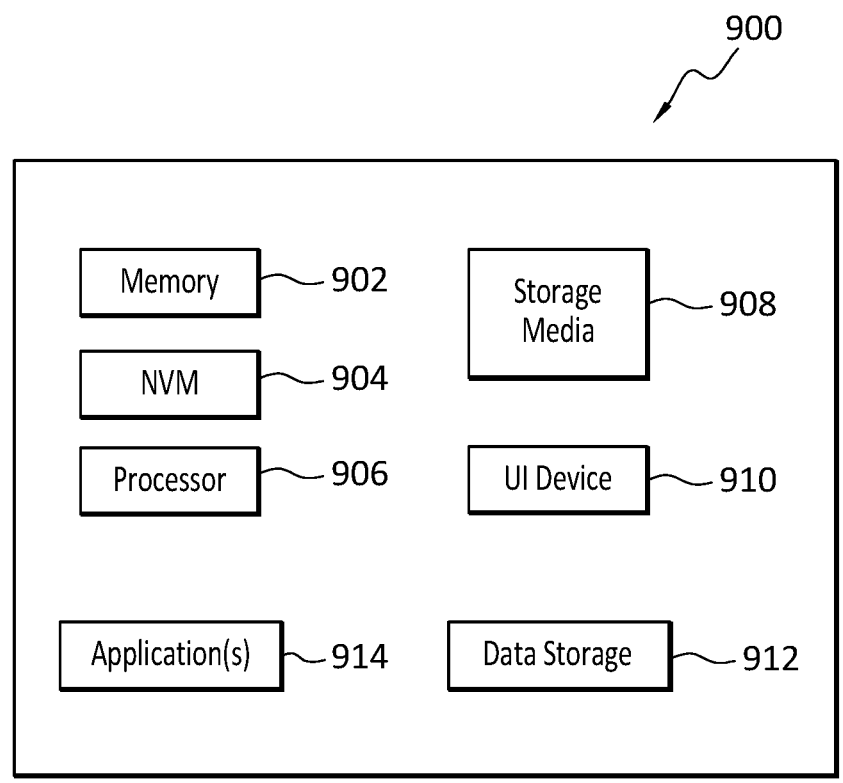
FIG. 9 discloses aspects of an example computing entity operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site, including but not limited to a cloud storage site or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   listening in real time, by a graph proxy hosted at a server accessible by event generators, one or more of which comprises an application, file server, or object store, for input/output (IO) operations incoming from the event generators;
   receiving in real time, by the graph proxy from each of the event generators, a respective continuous stream of events, wherein one of the continuous streams includes metadata of an event that comprises information about one of the IO operations and information about data to which the IO operation is directed;
   storing the respective continuous stream of events in a buffer;
   determining by the graph proxy that the metadata includes a schema, and identifying, by the graph proxy, a rule that is associated with the event, wherein the rule includes an edge rule and a vertex rule, each of which specifies performance of an action;
   determining that a condition of the vertex or edge rule is met in the metadata;
   creating and adding to a graph a vertex with a property of the metadata;
   determining that the condition of the edge rule is met by the metadata, and creating and adding an edge to the graph, and the edge connects two vertices and includes a property of the edge rule, wherein the property of the edge rule identifies a relationship between the two vertices; and
   when the edge is created, overlaying, in the graph, properties of metadata corresponding to the two vertices over the two vertices and the property of the edge rule over the edge.

2. The method as recited in claim 1, wherein the action comprises one of creating, updating, or deleting, an element of the graph.

3. The method as recited in claim 1, wherein the action is performed with respect to an element of the graph, and the element of the graph comprises one of a vertex, an edge, a property of a vertex, or a property of an edge.

4. The method as recited in claim 3, wherein the element is a property, and the action performed by the graph proxy comprises modifying the property.

5. The method as recited in claim 1, wherein the schema is a parent schema that references a child schema, and the data matches the parent schema and the child schema.

6. The method as recited in claim 1, wherein the action comprises creating an edge of the graph, and the method further comprises specifying a property for inclusion in the edge.

7. The method as recited in claim 1, wherein the schema is identified by implication.

8. The method as recited in claim 1, wherein the schema is identified by an association process in which a schema is derived from the data, and the schema to which the data is compared is the derived schema.

9. The method as recited in claim 1, further comprising creating, a priori based on another rule, an edge in the graph.

10. A non-transitory storage medium having stored therein instructions that are executable by one or more hardware processors to perform operations comprising:
    listening in real time, by a graph proxy hosted at a server accessible by event generators, one or more of which comprises an application, file server, or object store, for input/output (IO) operations incoming from the event generators;
    receiving in real time, by the graph proxy from each of the event generators, a respective continuous stream of events, wherein one of the continuous streams includes metadata of an event that comprises information about one of the IO operations and information about data to which the IO operation is directed;
    storing the respective continuous stream of events in a buffer;
    when the metadata is determined by the graph proxy to include a schema, identifying, by the graph proxy, a rule that is associated with the event, wherein the rule includes an edge rule and a vertex rule, each of which specifies performance of an action;
    determining whether or not a condition of the vertex or edge rule is met in the metadata;

when it is determined that the condition of the vertex rule is met by the metadata, creating and adding to a graph a vertex with a property of the metadata;

when it is determined that the condition of the edge rule is met by the metadata, creating and adding to the graph an edge, which connects two vertices and includes a property of the edge rule, wherein the property of the edge rule identifies a relationship between the two vertices; and when the edge is created, overlaying, in the graph, properties of metadata corresponding to the two vertices over the two vertices and the property of the edge rule over the edge.

11. The non-transitory storage medium as recited in claim 10, wherein the action comprises one of creating, updating, or deleting, an element of the graph.

12. The non-transitory storage medium as recited in claim 10, wherein the action is performed with respect to an element of the graph, and the element of the graph comprises one of a vertex, an edge, a property of a vertex, or a property of an edge.

13. The non-transitory storage medium as recited in claim 12, wherein the element is a property, and the action performed by the graph proxy comprises modifying the property.

14. The non-transitory storage medium as recited in claim 10, wherein the schema is a parent schema that references a child schema, and the data matches the parent schema and the child schema.

15. The non-transitory storage medium as recited in claim 10, wherein the action comprises creating an edge of the graph, and the operations further comprise specifying a property for inclusion in the edge.

16. The non-transitory storage medium as recited in claim 10, wherein the action is performed automatically when the condition is met by the schema and the event.

17. The non-transitory storage medium as recited in claim 10, wherein the schema is identified by implication.

18. The non-transitory storage medium as recited in claim 10, wherein the schema is identified by an association process in which a schema is derived from the data, and the schema to which the data is compared is the derived schema.

19. The non-transitory storage medium as recited in claim 10, further comprising creating, a priori based on another rule, an edge in the graph.

* * * * *